(12) United States Patent
Usuda et al.

(10) Patent No.: US 8,364,160 B2
(45) Date of Patent: Jan. 29, 2013

(54) TRANSMISSION RATE CONTROL METHOD, MOBILE STATION AND RADIO NETWORK CONTROLLER

(75) Inventors: Masafumi Usuda, Tokyo (JP); Anil Umesh, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 15 days.

(21) Appl. No.: 11/910,021

(22) PCT Filed: Mar. 29, 2006

(86) PCT No.: PCT/JP2006/306533
§ 371 (c)(1),
(2), (4) Date: Nov. 26, 2007

(87) PCT Pub. No.: WO2006/104207
PCT Pub. Date: Oct. 5, 2006

(65) Prior Publication Data
US 2008/0192685 A1    Aug. 14, 2008

(30) Foreign Application Priority Data
Mar. 29, 2005    (JP) .............................. P2005-096540

(51) Int. Cl.
*H04W 72/00* (2009.01)
(52) U.S. Cl. ................... 455/452.2; 455/450; 455/452.1; 370/329; 370/235
(58) Field of Classification Search ............... 370/138, 370/310, 229–230, 232–235, 328.329, 331, 370/338, 340, 341, 431, 335, 395.4; 455/403, 455/422.1, 450, 452.1–453, 455, 522, 561, 455/39, 500, 501, 502
See application file for complete search history.

(56) References Cited

U.S. PATENT DOCUMENTS
(Continued)

FOREIGN PATENT DOCUMENTS
EP    1 467 499 A2    10/2004
GB    2 402 021 A    11/2004
(Continued)

OTHER PUBLICATIONS
3GPP TS 25.309 V6.2.0 (Mar. 2005), Technical Specification, 3rd Generation Partnership Project; Technical Specification Group Radio Access Network; FDD Enhanced Uplink; Overall description; Stage 2, (Release 6), p. 1-p. 30.
(Continued)

*Primary Examiner* — Chuong A Ngo
(74) *Attorney, Agent, or Firm* — Marvin A. Motsenbocker; Mots Law, PLLC

(57) ABSTRACT

The present invention can flexibly adjust trade-off between the radio network capacity and the radio quality by changing increase step of uplink user data in accordance with the congestion of uplink or the uplink user data type. A transmission rate control method according to the present invention includes the steps of; notifying, at a radio network controller RNC, an increase pattern of the transmission rate of the uplink user data to a mobile station UE, when setting, with the mobile station UE, a user data channel connection for transmitting the uplink user data; and increasing, at the mobile station UE, the transmission rate of the uplink user data in accordance with the increase pattern, when receiving, from a radio base station Node B, a relative rate control channel RGCH for indicating that the transmission rate of the uplink user data should be increased.

4 Claims, 6 Drawing Sheets

U.S. PATENT DOCUMENTS

| | | | |
|---|---|---|---|
| 2003/0219037 A1 | 11/2003 | Toskala et al. | |
| 2004/0022176 A1 | 2/2004 | Hashimoto et al. | |
| 2004/0043783 A1* | 3/2004 | Anderson | 455/522 |
| 2004/0203448 A1* | 10/2004 | Nagata | 455/67.11 |
| 2004/0218533 A1* | 11/2004 | Kim et al. | 370/235 |
| 2005/0030964 A1 | 2/2005 | Tiedemann, Jr. et al. | |
| 2005/0036449 A1 | 2/2005 | Ranta-Aho et al. | |
| 2006/0159016 A1* | 7/2006 | Sagfors et al. | 370/230 |

FOREIGN PATENT DOCUMENTS

| | | |
|---|---|---|
| JP | 2001-339458 | 12/2001 |
| JP | 2003-032745 | 1/2003 |
| JP | 2003-289380 | 10/2003 |
| JP | 2004-214914 | 7/2004 |
| JP | 2004-282169 | 10/2004 |
| JP | 2004-282169 A | 10/2004 |
| JP | 2004-320165 | 11/2004 |
| JP | 2005-020076 | 1/2005 |
| KR | 2004-79805 | 9/2004 |
| WO | WO 2004/080006 A2 | 9/2004 |

OTHER PUBLICATIONS

Official Action Letter issued on Jun. 19, 2008 in the counterpart Singapore patent application.

The office communication of Mar. 4, 2011, issued in the counterpart Australian patent application.

The office communication of Dec. 13, 2011, issued in the counterpart Australian patent application.

* cited by examiner

TRANSMISSION RATE CONTROL METHOD, MOBILE STATION AND RADIO NETWORK CONTROLLER

TECHNICAL FIELD

The present invention relates to a transmission rate control method, mobile station and a radio network controller, which controls a transmission rate of uplink user data.

BACKGROUND ART

In a conventional mobile communication system, in an uplink from a mobile station UE to a radio base station Node B, a radio network controller RNC is configured to determine a transmission rate of a dedicated channel, in consideration of radio resource of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node A, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 11, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fact control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data transmission is performed as shown in FIG. 12(a), the data are transmitted by accepting low-speed, high-delay, and low-transmission efficiency as shown in FIG. 12(b), or, as shown in FIG. 12(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIG. 12.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sublayer (a layer-2) between the radio base station Node B and the mobile station UE, so as to utilize the radio resources effectively. Such discussions or discussed functions will be hereinafter referred to as "Enhanced Uplink (EUL)".

As shown in the non-patent document 1, a conventional mobile communication system using "EUL" is configured to; increase a transmission rate of uplink user data by adding a predetermined value to the transmission rate of uplink user data currently in use, when the mobile station UE has received a Relative rate Control Channel (RGCH) from the radio base station Node B, the RGCH indicating that the transmission rate of uplink user data should be increased (indicating "Up").

However, in the conventional mobile communication system using "EUL", the transmission rate of uplink user data is decreased at a fixed increase step, even when many uplink user date are transmitted in the uplink, or when the uplink user data type does not require very precipitous increase in the transmission rate, and the like. Therefore, there has been a problem that the transmission rate of the uplink user data is unnecessary increased.

In addition, in the conventional mobile communication system using "EUL", the transmission rate of uplink user data is increased at a fixed increase step, even when the uplink is unoccupied, or when the uplink user data type requires increase in the transmission rate, and the like. Therefore, there has been a problem that the level of increase in the transmission rate is insufficient.

(Non-patent Document 1) 3GPP TSG-RAN TS-25.309 v6.2.0

DISCLOSURE OF THE INVENTION

The present invention has been made considering the above-described problems, and its object is to provide a transmission rate control method, a mobile station and a radio network controller that makes it possible to flexibly adjust trade-off between the radio network capacity and the radio quality by changing increase step of uplink user data in accordance with the congestion of uplink or the uplink user data type.

A first aspect of the present invention is summarized as a transmission rate control method for controlling a transmission rate of uplink user data, including: notifying, at a radio network controller, an increase pattern of the transmission rate of the uplink user data to a mobile station, when setting, with the mobile station, a user data channel connection for transmitting the uplink user data; and increasing, at the mobile station, the transmission rate of the uplink user data in accordance with the increase pattern, when receiving, from a radio base station, a relative rate control channel for indicating that the transmission rate of the uplink user data should be increased.

In the first aspect, the radio network controller may include; notifying, at the radio network controller, an increase pattern of the transmission rate of the uplink user date to the radio base station, when setting a connection with the radio base station; and allocating, at the radio base station, a reception process resource of the uplink user data, on the assumption that the mobile station increases the transmission rate of the uplink user data in accordance with the increase pattern.

A second aspect of the present invention 18 summarized as a mobile station for transmitting uplink user data, including: an increase pattern receiving section configured to receive, from a radio network controller, an increase pattern of a transmission rate of the uplink user dab, when setting, with the radio network controller, a user data channel connection for transmitting the uplink user date; and a transmission rate control section configured to increase the transmission rate of the uplink user data in accordance with increase pattern, when receiving, from a radio base station, a relative rate control channel for indicating that the transmission rate of the uplink user data should be increased.

A third aspect of the present invention is summarized as a radio network controller used in a transmission rate control method for controlling a transmission rate of uplink user data, including an increase pattern notification section configured to notify, to a mobile station, an increase pattern of the transmission rate of the uplink user data, when setting, with the mobile station, a user date channel connection for transmitting the uplink user data.

BRIEF DESCRIPTION OF THE DRAWINGS

FIGS. 12(a) to 12 (a) are graphs illustrating operations at the time of burst data transmission in a conventional mobile communication system.

BEST MODE FOR CARRYING OUT THE INVENTION

Mobile Communication System According to First Embodiment of the Present Invention A description win be given of a configuration of a mobile communication system according to a first embodiment of the present invention with reference to FIGS. 1 to 8.

Figure 11:
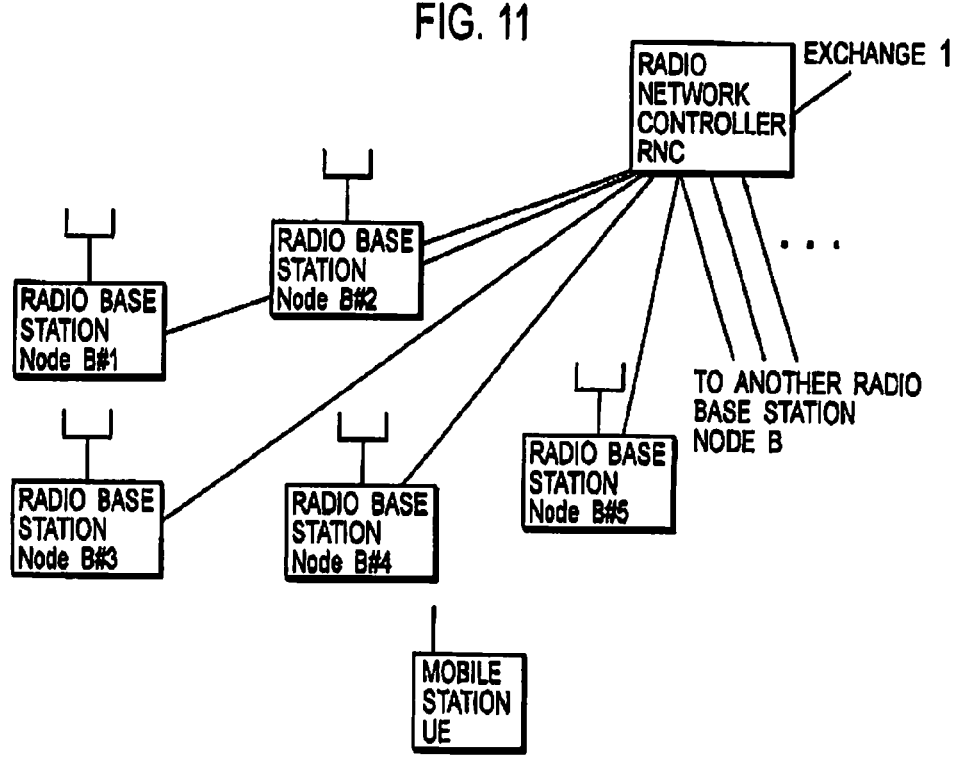
FIG. 11 is a diagram showing an entire configuration of a general mobile communication system.
Figure 12:
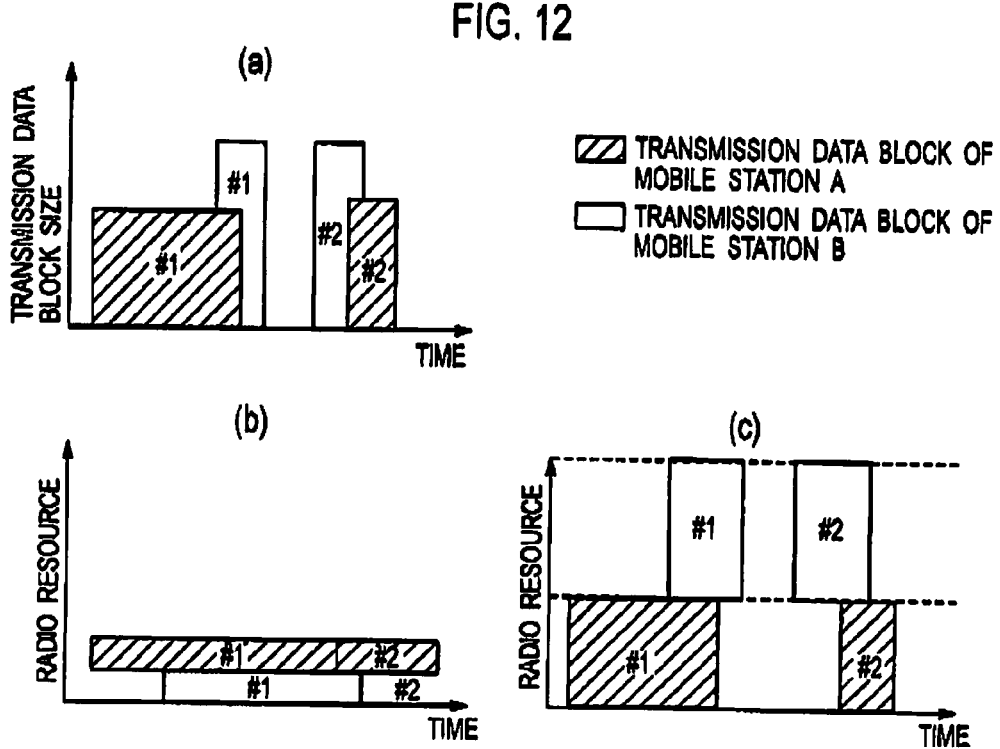

It should be noted that, as shown in FIG. 11, the mobile communication system according to this embodiment is provided with a plurality of radio base stations Nod B #1 to Node B #5 and a radio network controller RNC.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL retransmission control (N process stop and wait) shall be performed by a "Hybrid Automatic Repeat Request (HARQ)".

Therefore, an Enhanced Dedicated Physical Channel (E-DPCH), configured of an Enhanced Dedicated Physical Data Channel (E-DPDCH) and an Enhanced Dedicated Physical Control Channel (E-DPCCH), and a Dedicated Physical Channel (DPCH), configured of a Dedicated Physical Data Channel (DPDCH: Dedicated Physical Data Channel) and a Dedicated Physical Control Channel (DPCCH: Dedicated Physical Control Channel), am used in the uplink.

Here, the E-DPCCH transmits control data for the EUL such as a transmission format number for defining a transmission format (transmission block size, or the like) of the E-DPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a transmission power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" and a "Random Access Channel (RACH)", which are needed when the HSPDA is applied, are also used.

The HS-DPCCH transmits a Channel Quality Indicator (CQI) In a downlink and an acknowledge signal (Ack or Nack) for the HS-DPCCH.

Figure 1:
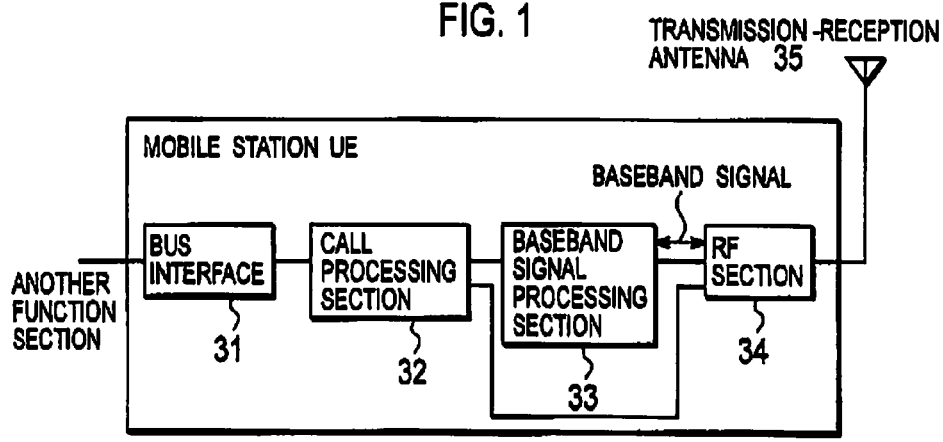
FIG. 1 is a functional block diagram of a mobile station of a mobile communication system according to the first embodiment of the present invention.

As shown in FIG. 1, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward user data output from the call processing section 32 to another functional section (for example, an application related functional section). In addition, the bus interface 31 is configured to forward user data transmitted from another functional section (for example, the application related functional section) to the call processing section 32.

The call processing section 32 is configured to perform a call control processing for transmitting and receiving user data.

The baseband signal processing section 33 is configured to transmit, to the call processing section 32, the user data acquired by performing, against the baseband signals transmitted from the RF section 34, a Layer-1 processing including a despreading processing, a RAKE combining processing, and an "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 2:
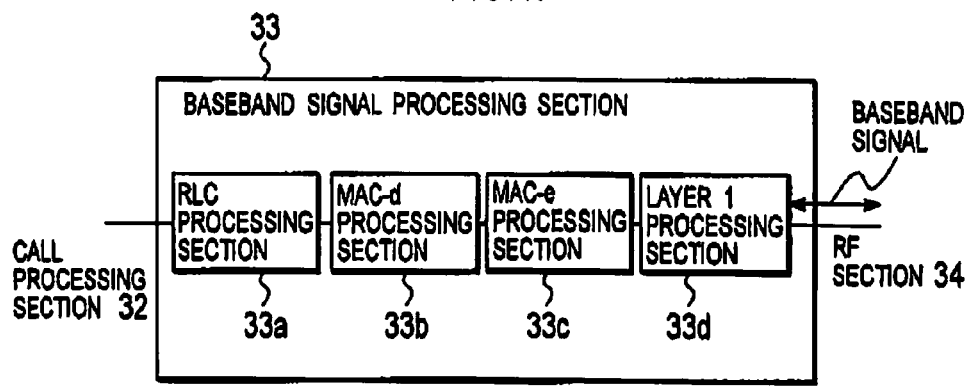
FIG. 2 is a functional block diagram of a baseband signal processing section in a mobile station of the mobile communication system according to the first embodiment of the present invention.

As shown in FIG. 2, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, end to create a transmission format in the uplink based on the limitation of transmission power.

Figure 3:
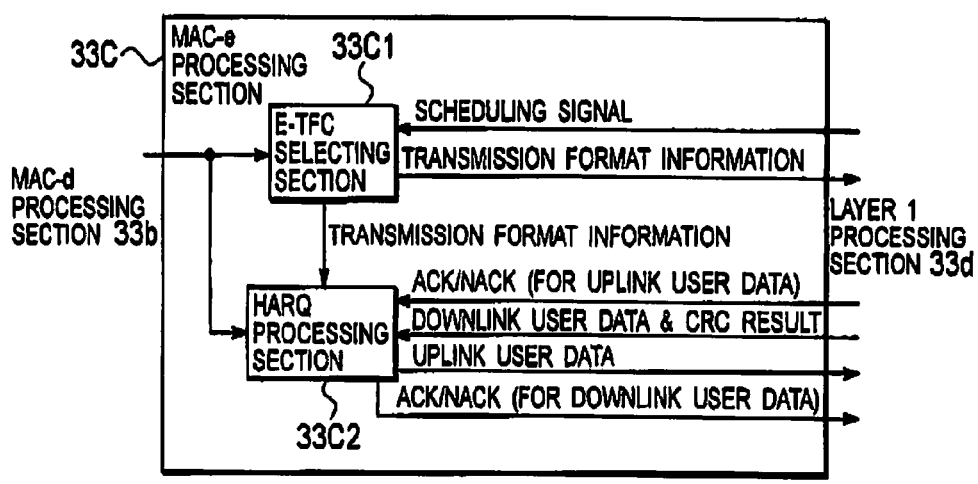
FIG. 3 is a functional block diagram of a MAC-e processing section of the baseband signal processing section in a mobile station of the mobile communication system according to the first embodiment of the present invention.

As shown in FIG. 3, the MAC-e processing section 330 is provided with an Enhanced Transport Format Combination (E-TFC) selecting section 33c1 and an HARQ processing section 33c2.

The E-TFC selecting section 33c1 is configured to determine a transmission format (E-TFC) of the E-DPDCH and the E-DPCCH, based on scheduling signals (for example, an RGCH) transmitted from the radio bass station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission format information to the HARQ processing section 33c2.

For example, the E-TFC selecting section 33c1 is configured to receive, from the radio network controller RNC, an increase pattern of the transmission rate of the uplink user data, when setting, with the radio network controller RNC, a user date channel connection for transmitting the uplink user data.

In addition, the E-TFC selecting section 33c1 is configured to increase the transmission rate of the uplink user data in accordance with the above-described increase pattern, when the E-TFC selecting section 33c1 has received, from the radio base station Node B, the RGCH for indicating that the transmission rate of uplink user data should be increased (indicating "Up").

Such scheduling signals are information that is notified in the cell where the mobile station UE is located, and includes control information for all the mobile stations located in the cell, or a specific group of the mobile stations located in the cell.

The HARQ processing section 33c2 is configured to perform process control for the "stop-and-wait of N-process", so as to transmit the user data in the uplink based on an acknowledge signal (Ack/Nack for uplink date) transmitted from the radio base station Node B.

Specifically, the HARQ processing section 33c2 is configured to determine whether or not the receive processing of downlink user data has been successful based on the result of the "Cyclic Redundancy Check (CRC)" entered from the layer-1 processing section 33d.

Then, the HARQ processing section 33c2 is configured to generate an acknowledge signal (Ack/Nack for downlink user data) based on the determined result, so as to transmit the acknowledge signal to the layer-1 processing section 33d.

In addition, the HARQ processing section 33c2 is configured to transmit, to the MAC-d processing 33d, the downlink user data entered from the layer-1 processing section 33d when the above-described determination result has been successful.

Figure 4:
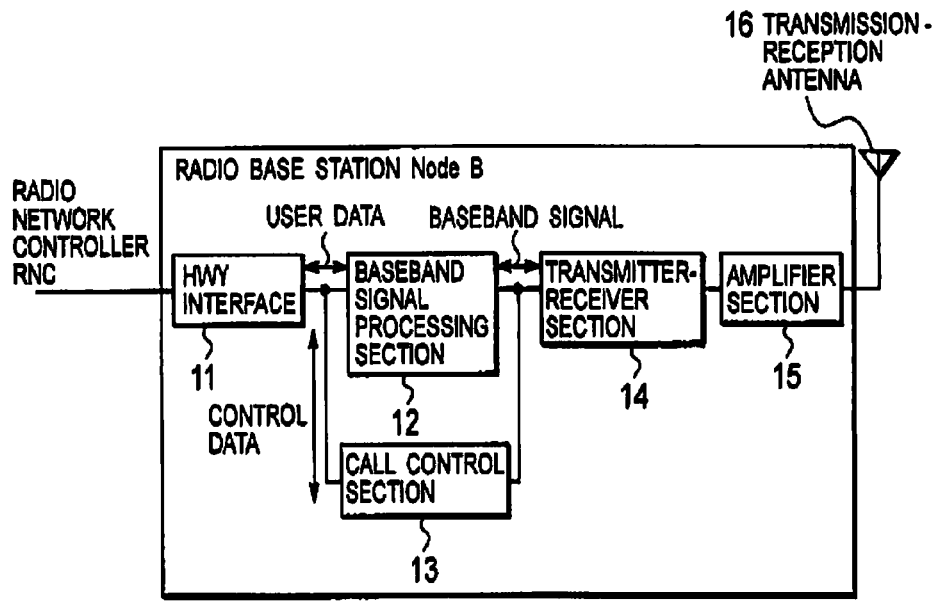
FIG. 4 is a functional block diagram of a radio base station of the mobile communication system according to the first embodiment of the present invention.

As shown in FIG. 4, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface for a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user date to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the RLC processing, the MAC processing (the MAC-d processing and the MAC-e processing), or the layer-1 processing against the user data acquired from the HWY interface 11, so as to forward the generated baseband signals to the transmitter-receiver section 14.

Here, the MAC processing in the downlink includes an HARQ processing, a scheduling processing, a transmission rate control processing, or the like.

In addition, the layer-1 processing includes a channel coding processing of user data, a spreading processing, or the like.

In addition, the baseband signal processing section 12 is configured to extract user data by performing the layer-1 processing, the MAC processing (the MAC-e processing and the MAC-d processing), or the RLC processing against the baseband signals acquired from the transmitter-receiver section 14, so as to forward the extracted user data to the HWY interface 11.

Here, the MAC processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the converted radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the converted baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 18.

In addition, the amplifier 16 is configured to amplify the uplink signals received by the transmission-reception antenna 16, so as to transmit the amplified uplink signals to the transmitter-receiver section 14.

Figure 5:
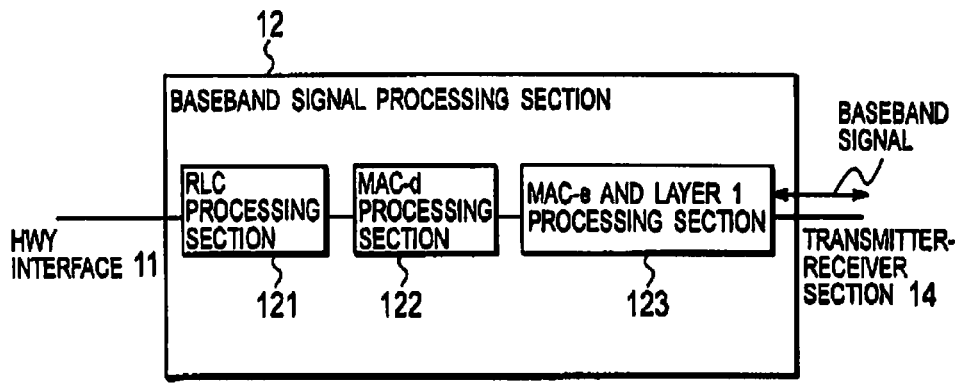
FIG. 5 is a functional block diagram of a baseband signal processing section in a radio base station of the mobile communication system according to the first embodiment of the present invention.

As shown in FIG. 5, the baseband signal processing section 12 is provided with a RLC processing section 121, a MAC-d processing section 122, and a MAC-e and layer-1 processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a disposal processing of header against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be acquired by software.

Figure 6:
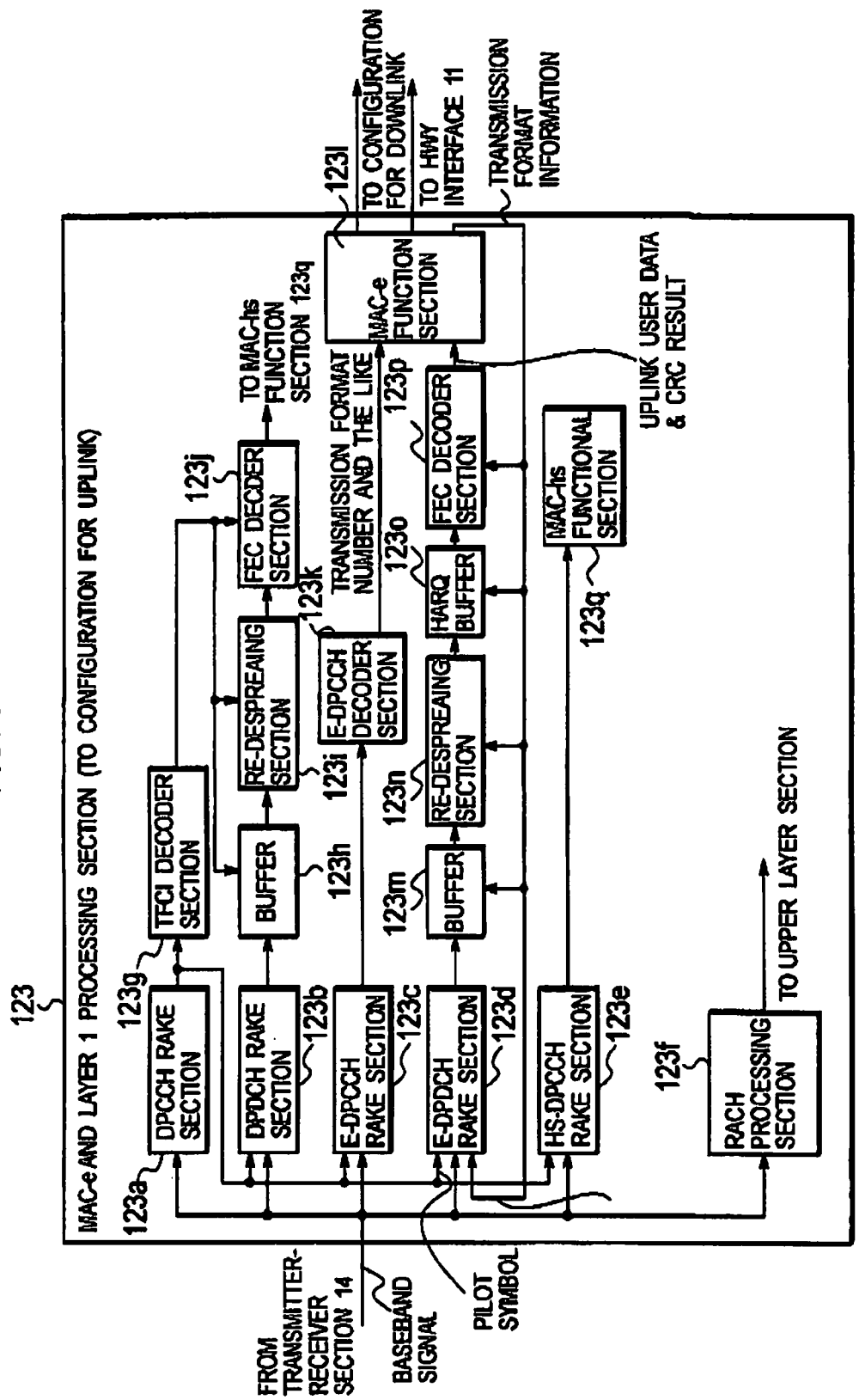
FIG. 6 is a functional block diagram of a MAC-e and Layer-1 processing section (configuration for uplink) of the baseband signal processing section of a radio base station of the mobile communication system according to the first embodiment of the present invention.

As shown in FIG. 6, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 1239, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q.

The E-DPCCH RAKE section 123c is configured to perform, against the E-DPCCH in the baseband signals transmitted from the transmitter-receiver section 14, the despreading processing and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPCCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d stored in the buffer 123m, based on the transmission format information (spreading factor) transmitted from the MAC-e functional section 123l.

The HARQ buffer 123o is configured to store the despreading processing outputs of the re-spreading section 123n, based on the transmission format information transmitted from the MAC-e functional section 123l.

The FEC decoder section 123p is configured to perform an error correction decoding processing (the FEC decoding processing) against the despreading processing outputs of the re-despreading section 123n, which is stored in the HARQ buffer 123o, based on the transmission format information (transmission data block size) transmitted from the MAC-e functional section 123l.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 7:
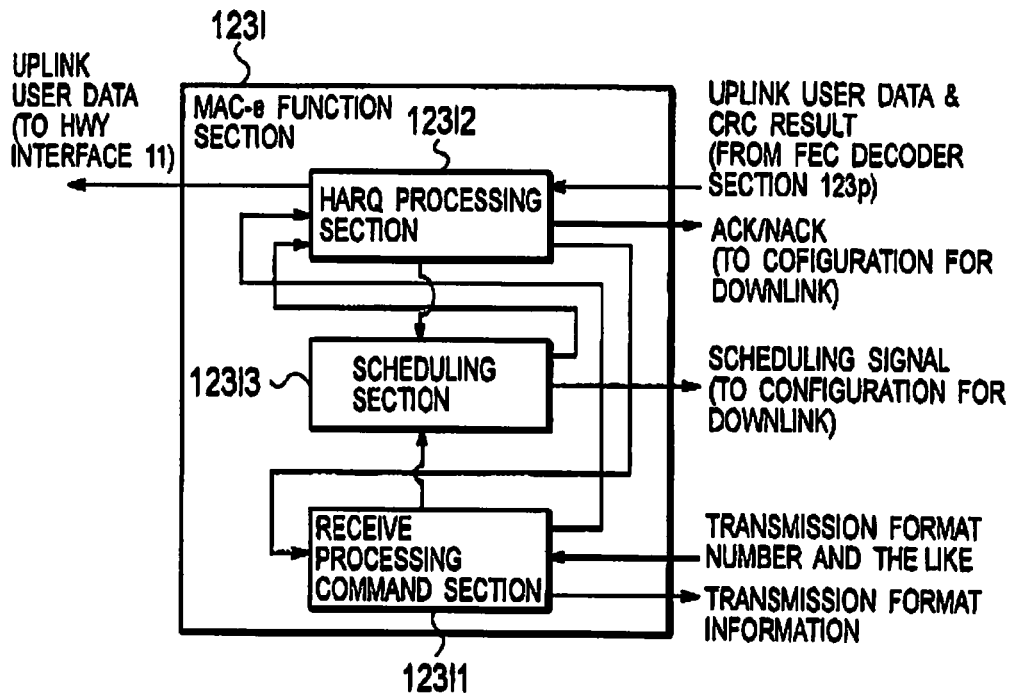
FIG. 7 is a functional block diagram of a MAC-e functional section of the MAC-e and Layer-1 processing section (configuration for uplink), in the baseband signal processing section in a radio base station of the mobile communication system according to the first embodiment of the present invention.

In addition, as shown in FIG. 7, the MAC-e functional section 123l is provided with a receive processing command section 123/1, an HARQ processing section 123/2, and a scheduling section 123/3.

The receive processing command section 123/1 is conjured to transmit the transmission format number related information, the HARQ related information, and the scheduling related information, which are entered from the E-DPCCH decoder section 123k, to the HARQ processing section 123/2.

In addition, the receive processing command section 123/1 is configured to transmit, to the scheduling section 123/3, the scheduling related information entered from the E-DPCCH decoder 123k.

Further, the receive processing command section 123/1 is configured to output the transmission format information corresponding to the transmission format number entered from the E-DPCCH decoder section 123k.

The HARQ processing section 123/2 is configured to determine whether or not the receive processing of uplink user data has been successful, based on the CRC result entered from the FEC decoder section 123p.

Then, the HARQ processing section 123/2 is configured to generate an acknowledge signal (Ack or Nack), based on the determination result, so as to transmit the generated acknowledge signal to the configuration for the downlink of the baseband signal processing section 12.

In addition, the HARQ processing section 123/2 is configured to transmit the uplink user data entered from the FEC decoder section 123p to the radio network controller RNC, when the above determination result has been successful.

In addition, the HARQ processing section 123/2 is configured to clear soft decision values stored in the HARQ buffer 123o, when the above determination result has been successful.

On the other hand, the HARQ processing section 123/2 is configured to store, in the HARQ buffer 123o, the uplink user data, when the above determination result has not been successful.

In addition, the HARQ processing section 123/2 is configured to forward the above determination result to the receive processing command section 123/1.

The receive processing control command section 123/1 is configured to notify the E-DPDCH RAKE section 123d and the buffer 123m of an hardware resource that should be prepared for the following transmission time interval (TTI), so as to perform notification for reserving the resource in the HARQ buffer 123o.

In addition, when the uplink user data is stored in the buffer 123m, the receive processing command section 123/1 is configured to instruct the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

The scheduling section 123/3 is configured to transmit a scheduling signal (for example, an RGCH) via a configuration for downlink.

The radio network controller RNC according to the present embodiment is an apparatus located on upper level of the radio base station Node B and configured to control radio communication between the radio base station Node B and the mobile station UE.

Figure 8:
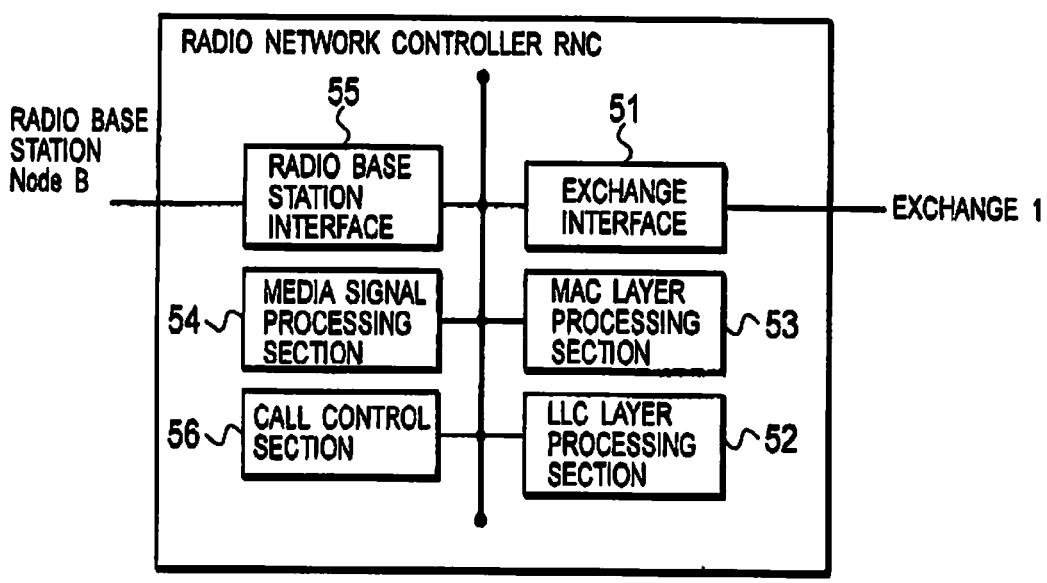
FIG. 8 is a functional block diagram of a radio network controller of the mobile communication system according to the first embodiment of the present invention.

As shown in FIG. 8, the radio network controller RNC according to this embodiment is provided with an exchange interface 51, a Logical Link Control (LLC) layer processing section 52, a MAC layer processing section 53, a media signal processing section 54, a radio base station interface 55, and a call control section 66.

The exchange interface 51 is an interface with an exchange 1. The exchange interface 51 is configured to forward the downlink signals transmitted from the exchange 1 to the LLC layer processing section 52, and to forward the uplink signals transmitted from the LLC layer processing section 52 to the exchange 1.

The LLC layer processing section 52 is configured to perform an LLC sublayer processing such as a synthesis processing of a header such as a sequence number or a trailer.

The LLC layer processing section 52 is also configured to transmit the uplink signals to the exchange interface 51 and to transmit the downlink signals to the MAC layer processing section 63, after the LLC sublayer processing is performed.

The MAC layer processing section 53 is configured to perform a MAC layer processing such as a priority control processing or a header granting processing.

The MAC layer processing section 53 is also configured to transmit the uplink signals to the LLC layer processing section 52 and to transmit the downlink signals to the radio base station interface 55 (or a media signal processing section 64), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 56 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 55 is configured to perform a radio resource control processing, a channel setup and open processing by the layer-3 signaling, or the like. Here, the radio resource control processing includes a call admission control processing, a handover processing, or the like.

The call control section 56 is configured to notify an increase pattern of a transmission rate of uplink user data to the mobile station UE, when setting, with the mobile station UE, a user data channel connection for transmitting uplink user dew.

Further, the call control section 66 may be configured to notify an increase pattern of the transmission rate of the uplink user data to the radio base station Node B, when setting a connection with the radio base station Node B.

Figure 9:
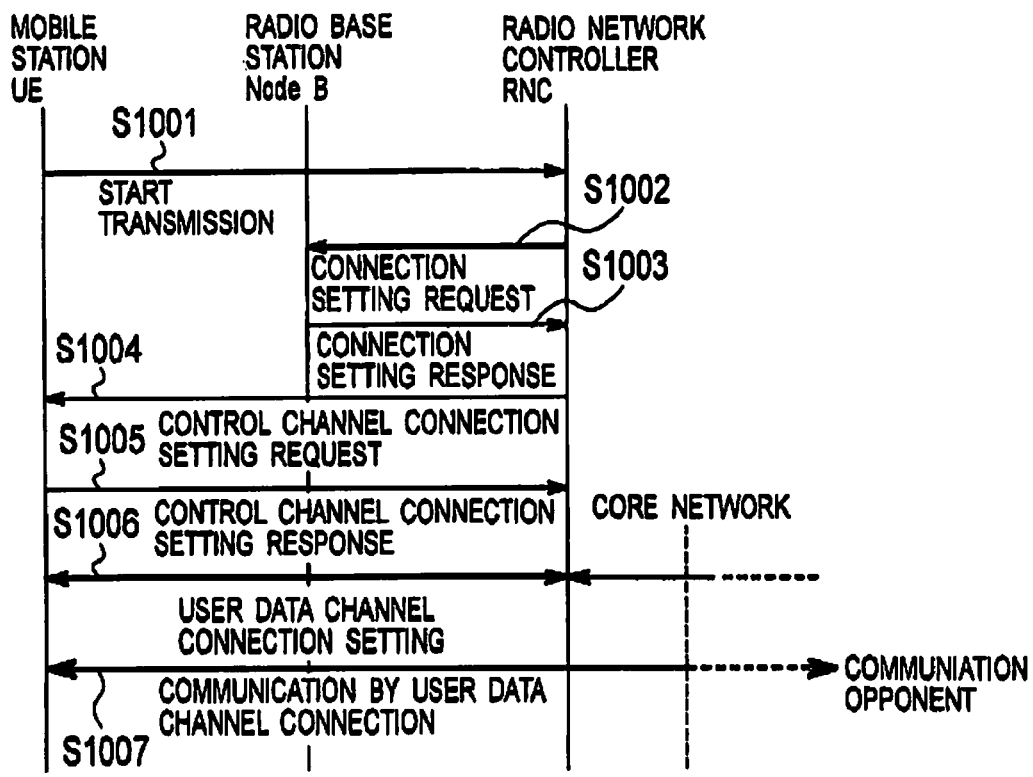
FIG. 9 is a sequence diagram of an operation of a mobile communication system according to the first embodiment of the present invention.

With reference to FIG. 9, the operation of the mobile communication system according to the first embodiment of the present invention will be described. Here, in FIG. 9, although the example is given to a case where the mobile station UE originates a call to the radio network controller RNC, the present invention is also applicable to a case where the mobile station receives a call.

As shown in FIG. 9, in step S1001, the mobile station UE starts transmission in order to request the communication setup (setting a user data channel connection) by using the E-DPCH to the radio network controller RNC.

In step S1002, the radio network controller RNC requests the radio base station Node B to set connection for the E-DPCH. Here, the mobile station UE is located on lower level of the radio base station Node B.

In step S1003, when the radio base station Node B has completed setting of the connection, the radio base station Node B transmits the connection setting response indicating that the connection has set, to the radio network controller RNC.

In step S1004, the radio network controller RNC transmits control channel connection setting request to the mobile station UE. The control channel connection setting request is a request for setting a control channel connection for transmitting or receiving the information such as a user data type, a release number of the mobile station, or a transmittable/receivable transmission rate.

In step S1005, when the mobile station UE has completed setting of the control channel connection, the mobile station UE transmits the control channel connection setting response to the radio network controller RNC. The control channel connection setting response indicates that the connection setting has been completed.

In step S1006, each parameter relating to the E-DPCH (for example, a transmission wave amplitude ratio in each transmission format) is transferred between the mobile station UE and the radio network controller RNC. Thus, the user data channel connection is set.

In step S1007, a communication between the mobile station UE and the radio network controller RNC is performed by using the user data channel connection (for example, an E-DPDCH) which has set in step S 1008.

Further, in step S1002, the radio network controller notifies an increase pattern of the transmission rate of the uplink user data (corresponding to the E-RGCH) to the radio base station Node B.

Then, the radio base station Node B allocates reception process resource of the uplink user data on the assumption that the mobile station UE increases the transmission rate of the uplink user data in accordance with the notified increase pattern.

In addition, in transmitting or receiving each parameter in step S1008, the radio network controller RNC notifies the increase pattern of the transmission rate of the uplink user data (corresponding to the E-RGCH) to the mobile station UE.

Figure 10:
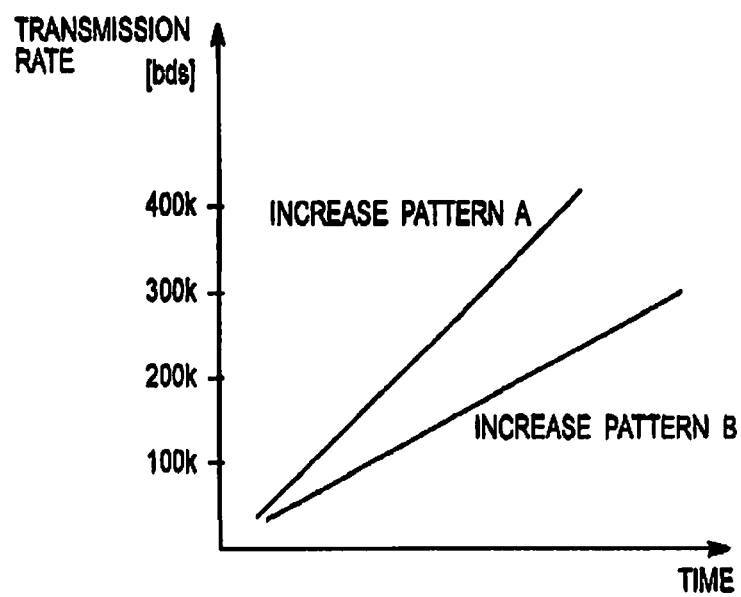
FIG. 10 is an example of the transmission rate increase pattern used in a mobile communication system according to the first embodiment of the present invention.

FIG. 10 shows an example of the increase pattern of the transmission rate of the uplink user data. For example, the radio network controller RNC notifies the increase pattern B when many uplink user data are transmitted in the uplink, so as to reduce fluctuation of interference caused by precipitous increase in the transmission rate of the uplink user data. It should be noted that the radio network controller RNC comprises a plurality of the increase pattern, and may be configured to notify the increase pattern selected based on a predetermined standard. Further, the radio network controller RNC may be configured to calculate the slope of time function of the increase pattern and to notify the calculated inclination of time function.

In addition, in step S1007, when the RGCH indicating "Up" has been received from the radio base station Node B, the mobile station UE increases the transmission rate of the uplink user data in accordance with the increase pattern corresponding to the E-RGCH.

Although the present invention has been described in detail above with the embodiment, it is apparent to those skilled in the art that the present invention is not limited to the embodiment described in the present application. The present invention can be implemented as altered and modified embodiments without departing from the spirit and scope of the present invention as defined by the description of claims. Therefore, the description of the present application is for illustrative purposes and is not intended to limit the present invention in any way.

Industrial Applicability

As described above, the present invention can provide a transmission rate control method, a mobile station and a radio network controller that makes it possible to flexibly adjust trade-off between the radio network capacity and the radio quality by changing increase step of uplink user data in accordance with the congestion of uplink or the uplink user data type.

The invention claimed is:

1. A transmission rate control method for controlling a transmission rate of uplink user data, comprising:
    notifying, from a radio network controller, to a mobile station, information for determining an increasing relative transmission rate step size corresponding to each transmission rate of the uplink user data, when setting, with the mobile station, a user data channel connection for transmitting the uplink user data; and
    increasing, at the mobile station, the transmission rate of the uplink user data in accordance with the increasing relative transmission rate step size corresponding to a current transmission rate of the uplink user data, when receiving, from a radio base station, a relative rate control channel for indicating that the transmission rate of the uplink user data should be increased, wherein an increasing relative transmission rate step size is a step size of transmission rate of the uplink user data to be changed based on a relative grant command in the relative rate control channel.

2. The transmission rate control method according to claim 1, comprising:
    notifying, from the radio network controller, to the base station, information for determining the increasing step corresponding to each transmission rate of the uplink user data, when setting a connection with the radio base station; and
    allocating, at the radio base station, a reception process resource of the uplink user data, on the assumption that the mobile station increases the transmission rate of the uplink user data in accordance with the increasing step corresponding to the current transmission rate of the uplink user data.

3. A mobile station for transmitting uplink user data, comprising:
    an increase pattern receiving section configured to receive, from a radio network controller, information for determining an increasing relative transmission rate step size corresponding to each transmission rate of the uplink user data, when setting, with the radio network controller, a user data channel connection for transmitting the uplink user data; and
    a transmission rate control section configured to increase the transmission rate of the uplink user data in accordance with the increasing relative transmission rate step size corresponding to a current transmission rate of the uplink user data, when receiving, from a radio base station, a relative rate control channel for indicating that the transmission rate of the uplink user data should be increased, wherein an increasing relative transmission rate step size is a step size of transmission rate of the uplink user data to be changed based on a relative grant command in the relative rate control channel.

4. A radio network controller used in a transmission rate control method for controlling a transmission rate of uplink user data, comprising an increasing step notification section configured to notify, to a mobile station, information for determining an increasing relative transmission rate step size corresponding to each transmission rate of the uplink user data, when setting, with the mobile station, a user data channel connection for transmitting the uplink user data, wherein an increasing relative transmission rate step size is a step size of transmission rate of the uplink user data to be changed based on a relative grant command;
    wherein, the increasing step notification section configured to notify, to the base station, information for determining the increasing step corresponding to each transmission rate of the uplink user data, when setting a connection with the radio base station.

* * * * *